United States Patent
Arai et al.

(10) Patent No.: US 10,480,399 B2
(45) Date of Patent: Nov. 19, 2019

(54) STRUCTURE AND METHOD FOR JOINING NOZZLE VANE AND LEVER, AND VARIABLE GEOMETRY TURBOCHARGER

(71) Applicant: MITSUBISHI HEAVY INDUSTRIES ENGINE & TURBOCHARGER, LTD., Sagamihara-shi, Kanagawa (JP)

(72) Inventors: Takashi Arai, Tokyo (JP); Hitomi Otsubo, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 499 days.

(21) Appl. No.: 15/039,278

(22) PCT Filed: Dec. 16, 2013

(86) PCT No.: PCT/JP2013/083552
§ 371 (c)(1),
(2) Date: May 25, 2016

(87) PCT Pub. No.: WO2015/092843
PCT Pub. Date: Jun. 25, 2015

(65) Prior Publication Data
US 2017/0022891 A1    Jan. 26, 2017

(51) Int. Cl.
*F02B 37/24* (2006.01)
*F02B 39/00* (2006.01)
(Continued)

(52) U.S. Cl.
CPC .......... *F02B 37/24* (2013.01); *B23K 15/0053* (2013.01); *B23K 15/0093* (2013.01);
(Continued)

(58) Field of Classification Search
CPC .. F02B 37/24; F02B 33/40; F02C 6/12; F01D 5/04; F01D 9/02; F01D 17/16; F01D 17/165
(Continued)

(56) References Cited

U.S. PATENT DOCUMENTS 10,041,351 B2 *   8/2018   Zollinger .................. F02C 6/12
10,047,607 B2 *   8/2018   Thirion .................... F01D 5/025
(Continued)

FOREIGN PATENT DOCUMENTS

CN    101668933 A    3/2010
CN    103079743 A    5/2013
(Continued)

OTHER PUBLICATIONS https://www.steelforge.com/literature/metal-melting-ranges/ (Year: 2014).*
(Continued)

*Primary Examiner* — Aaron R Eastman
(74) *Attorney, Agent, or Firm* — Birch, Stewart, Kolasch & Birch, LLP

(57) ABSTRACT

An object is to provide a structure and a method of joining a nozzle vane and a lever, and a variable geometry turbocharger, capable of reducing breakage of a welded part between a shaft portion of the nozzle vane and the lever during usage of the same by reducing generation of a hot crack in weld metal at the welded part. A joint structure includes: a nozzle vane 2 disposed in an exhaust passage for guiding exhaust gas to a turbine wheel 34 of a variable geometry turbocharger 500, and including a shaft portion 2a; and a lever 1 including a fitting surface 42a fitted with a peripheral surface 72 on one end side of the shaft portion, for transmitting torque to the shaft portion to adjust a vane angle of the nozzle vane. Weld metal 50 at a welded part 40

(Continued)

between the lever and the nozzle vane is formed so that a center position 64 of the weld metal is disposed inside a position 17 of the fitting surface with respect to a radial direction of the shaft portion.

7 Claims, 7 Drawing Sheets

(51) Int. Cl.

| | |
|---|---|
| *B23K 31/00* | (2006.01) |
| *F02C 6/12* | (2006.01) |
| *F01D 5/04* | (2006.01) |
| *F01D 9/02* | (2006.01) |
| *F01D 17/16* | (2006.01) |
| *F02B 33/40* | (2006.01) |
| *B23K 15/00* | (2006.01) |
| *B23K 26/28* | (2014.01) |
| *B23K 26/323* | (2014.01) |
| *B23K 101/00* | (2006.01) |
| *B23K 103/04* | (2006.01) |
| *B23K 103/18* | (2006.01) |

(52) U.S. Cl.
CPC ............ *B23K 26/28* (2013.01); *B23K 26/323* (2015.10); *B23K 31/003* (2013.01); *F01D 5/04* (2013.01); *F01D 9/02* (2013.01); *F01D 17/16* (2013.01); *F02B 33/40* (2013.01); *F02B 39/00* (2013.01); *F02C 6/12* (2013.01); *B23K 2101/001* (2018.08); *B23K 2103/05* (2018.08); *B23K 2103/18* (2018.08); *B23K 2103/26* (2018.08); *F01D 17/165* (2013.01); *F05D 2220/40* (2013.01); *F05D 2230/232* (2013.01); *F05D 2300/177* (2013.01); *Y02T 10/144* (2013.01)

(58) Field of Classification Search
USPC .......................................................... 415/164
See application file for complete search history.

(56) References Cited

U.S. PATENT DOCUMENTS

| | | | |
|---|---|---|---|
| 2002/0119039 A1* | 8/2002 | Jinnai ................... | F01D 17/165 415/1 |
| 2005/0008489 A1* | 1/2005 | Perruchaut .............. | F01D 17/16 416/160 |
| 2009/0269235 A1* | 10/2009 | Fukae ....................... | B22F 3/12 419/11 |
| 2010/0124489 A1 | 5/2010 | Suzuki et al. | |
| 2013/0272781 A1* | 10/2013 | Oiwa ................. | B23K 26/0823 403/271 |
| 2016/0146037 A1* | 5/2016 | Scott ....................... | F02B 37/24 415/148 |
| 2016/0230586 A1* | 8/2016 | King ..................... | F01D 17/165 |

FOREIGN PATENT DOCUMENTS

| | | |
|---|---|---|
| EP | 0 745 449 A1 | 12/1996 |
| EP | 2 617 512 A1 | 7/2013 |
| JP | 3-239935 A | 10/1991 |
| JP | 2002-256876 A | 9/2002 |
| JP | 2007-187015 A | 7/2007 |
| JP | 2010-151008 A | 7/2010 |
| JP | 2012-618 A | 1/2012 |
| JP | 2012-61499 A | 3/2012 |
| JP | 2012-149612 A | 8/2012 |
| JP | 2013-108918 A | 6/2013 |

OTHER PUBLICATIONS

International Preliminary Report on Patentability and Written Opinion of the International Searching Authority (forms PCT/IB/373, PCT/ISA/237, PCT/IB/338 and PCT/IB/326), dated Jun. 30, 2016, for International Application No. PCT/JP2013/083552, with an English translation of the Written Opinion.
International Search Report (forms PCT/ISA/210 and PCT/ISA/220), dated Jan. 28, 2014, for International Application No. PCT/JP2013/083552.
Office Action dated Oct. 19, 2017, issued to the corresponding CN Application No. 201380080887.3 with an English Translation.
Extended European Search Report dated Dec. 5, 2016 issued in the corresponding EP Application No. 13899660.8.
Second Office Action dated Jul. 13, 2018, issued to the corresponding Chinese Application No. 201380080887.3 with an English Translation.

* cited by examiner

STRUCTURE AND METHOD FOR JOINING NOZZLE VANE AND LEVER, AND VARIABLE GEOMETRY TURBOCHARGER

TECHNICAL FIELD

The present disclosure relates to a structure and a method for joining a nozzle vane and a lever, and a variable geometry turbocharger.

BACKGROUND ART

A known variable geometry turbocharger to be applied to an internal combustion engine includes a nozzle vane disposed in an exhaust channel for guiding exhaust gas to a turbine wheel, the nozzle vane including a shaft portion, and a lever (arm) to be fitted to one end of the shaft portion to transmit torque to the shaft portion to adjust a vane angle of the nozzle vane (Patent Document 1, for instance).

CITATION LIST

Patent Literature

Patent Document 1: JP2007-187015A

SUMMARY

Problems to be Solved

If the shaft portion of the nozzle vane and the lever used in the above described variable geometry turbocharger are to be joined by welding, a crack due to deformation accompanying solidification of weld metal (hereinafter, referred to as "a hot crack") may be generated in the weld metal in welding, and the hot crack may expand during usage of the nozzle vane and the lever to bring about breakage of a welded part.

An object of some embodiments of the present invention is to provide a structure and a method of joining a nozzle vane and a lever, and a variable geometry turbocharger, capable of reducing breakage of a welded part between a shaft portion of the nozzle vane and the lever during usage of the nozzle vane and the lever by reducing generation of a hot crack in weld metal at the welded part.

Solution to the Problems (1) A joint structure of a nozzle vane and a lever according to some embodiments of the present invention comprises: a nozzle vane to be disposed in an exhaust passage for guiding exhaust gas to a turbine wheel of a variable geometry turbocharger, the nozzle vane including a shaft portion; and a lever including a fitting surface to be fitted with a peripheral surface on one end side of the shaft portion, for transmitting torque to the shaft portion to adjust a vane angle of the nozzle vane. The lever and the one end side of the shaft portion are joined to each other by welding. Weld metal at a welded part between the lever and the one end side of the shaft portion is formed so that a center position of the weld metal is disposed inside a position of the fitting surface with respect to a radial direction of the shaft portion.

In a joint structure of a nozzle vane and a lever, if one end side of a shaft portion and the lever are to be joined by welding, weld metal is cooled by a base member to solidify from periphery to center. In response to great stress applied to the weld metal due to deformation accompanying solidification, a crack (so-called hot crack) may be produced in a non-solidified region of the weld metal, which is a center region of the weld metal being a final solidification region. If such a hot crack is produced in the weld metal, the crack may expand during usage of the nozzle vane and the lever, and the welded part between the nozzle vane and the lever may break apart.

As a result of intensive researches conducted by the present inventors on this issue, it was found that, if a position of a fitting surface of a lever to be fitted with a peripheral surface of a shaft portion coincides with the center position of weld metal in the radial direction of the shaft portion (the positions generally coincide in a normal welding method), great stress may be applied to the above region when the peripheral surface of the shaft portion and the fitting surface try to move away from each other due to deformation accompanying solidification of weld metal, thereby producing a hot crack.

Thus, the joint structure described in the above (1) employs a configuration in which, in the radial direction of the shaft portion, the center position of the weld metal is disposed inside the position of the fitting surface. In this way, even if the peripheral surface of the shaft portion and the fitting surface of the lever try to move away from each other due to deformation accompanying solidification of the weld metal, stress generated in the above region is effectively reduced, which reduces generation of a crack in the weld metal. As a result, it is possible to reduce breakage of the welded part between the nozzle vane and the lever during usage of the nozzle vane and the lever.

(2) In some embodiments, in the joint structure of a nozzle vane and a lever described in the above (1), the weld metal is formed inside the fitting surface with respect to the radial direction of the shaft portion.

With the above joint structure (3), even if the peripheral surface of the shaft portion and the fitting surface of the lever try to move away from each other due to deformation accompanying solidification of the weld metal, stress applied to the weld metal is effectively reduced, which reduces generation of a crack in the weld metal. As a result, it is possible to reduce breakage of the welded part between the nozzle vane and the lever during usage of the nozzle vane and the lever.

(3) In some embodiments, in the joint structure of a nozzle vane and a lever described in the above (1) or (2), the lever includes: a first contact surface formed to extend inward in the radial direction of the shaft portion from a first end of the fitting surface with respect to the axial direction of the shaft portion, and to contact the shaft portion from the axial direction of the shaft portion; and a second contact surface formed to extend outward in the radial direction of the shaft portion from a second end of the fitting surface with respect to the axial direction of the shaft portion, and to contact the shaft portion from the axial direction of the shaft portion.

In the above joint structure (2), with the first contact surface and the second contact surface, it is possible to suppress the motion of the peripheral surface of the shaft portion and the fitting surface of the lever to move away from each other due to deformation accompanying solidification of the weld metal. As a result, stress applied to the weld metal is effectively reduced and generation of a crack in the weld metal is reduced, which makes it possible to reduce breakage of the welded part between the nozzle vane and the lever during usage of the nozzle vane and the lever.

(4) In some embodiments, in the joint structure of a nozzle vane and a lever described in any one of the above (1) to (3), the variable geometry turbocharger is for a gasoline engine, and the nozzle vane is composed of nickel-based alloy, and the lever is composed of stainless steel.

Conventionally, a variable geometry turbocharger is widely used for diesel engines, and a nozzle component is normally made of stainless steel (typically, austenite stainless steel). In contrast, if a variable geometry turbocharger is to be used in a gasoline engine, it is difficult to use stainless steel as a material of the nozzle vane for the following reason. That is, the nozzle vane is exposed to high-temperature exhaust gas due to its function, and an exhaust-gas temperature of a gasoline engine is higher than that of a diesel engine (in an example, an exhaust-gas temperature of a diesel engine is approximately 850 degrees and that of a gasoline engine is approximately 1000 degrees). Thus, it is difficult to use stainless steel in view of thermal stress, thermal expansion, and oxidization generated at the exhaust-gas temperature of a gasoline engine. In this context, it is desirable to use nickel-based alloy as a constituent material of a nozzle vane in a variable geometry turbocharger for a gasoline engine.

On the other hand, since nickel-based alloy has a high strength against heat and a high oxidization-resistant property, it is difficult to perform cold pressing such as fine blanking pressing, which could be used to join two stainless objects, to join the nozzle vane and the lever. Thus, it is desirable to join the nozzle vane to the lever by welding.

However, nickel-based alloy contains many types of elements such as titanium and niobium, which increases the risk of generation of the above described hot crack during welding (titanium and niobium may be a cause that increases sensitivity to hot cracking).

In this regard, in the above joint structure (4), the nozzle vane is made of nickel-based alloy to resist high-temperature exhaust gas of a gasoline engine, and the joint structure described in the above (1) is employed to reduce generation of a hot crack in welding, which makes it possible to suitably apply the joint structure to a variable geometry turbocharger for a gasoline engine.

(5) A variable geometry turbocharger according to some embodiments comprises: the joint structure according to any one of the above (1) to (4); the turbine wheel; and a compressor driven by the turbine wheel.

With the above variable geometry turbocharger (5), at least the above joint structure (1) is provided. Thus, even if the peripheral surface of the shaft portion and the fitting surface of the lever try to move away from each other due to deformation accompanying solidification of the weld metal, stress generated in the above region is effectively reduced, which reduces generation of a crack in the weld metal. In this way, it is possible to achieve stable operation of the turbocharger.

(6) A joint structure of a nozzle vane and a lever according to some embodiments comprises: a nozzle vane to be disposed in an exhaust passage for guiding exhaust gas to a turbine wheel of a variable geometry turbocharger, the nozzle vane including a shaft portion; and a lever including a fitting surface to be fitted with a peripheral surface on one end side of the shaft portion, for transmitting torque to the shaft portion to adjust a vane angle of the nozzle vane. The nozzle vane is composed of nickel-based alloy, the lever is composed of stainless steel, and the lever and the one end side of the shaft portion are welded to each other, and a radiation-center position radiated by heat for welding is disposed outside a position of the fitting surface with respect to a radial direction of the shaft portion.

Since a nozzle vane made of nickel-based alloy has a high strength against heat and a high oxidization-resistant property, it is difficult to perform cold pressing such as fine blanking pressing, which could be used to join two stainless objects, to join the nozzle vane and the lever. Thus, it is desirable to join the nozzle vane to the lever by welding.

However, nickel-based alloy contains many types of elements such as titanium and niobium, which increases the risk of generation of a hot crack in weld metal during welding (titanium and niobium may be a cause that increases sensitivity to hot cracking).

In this regard, with the above joint structure (6), the lever and the one end side of the shaft portion are welded by radiating heat so that the radiation-center position is at the position outside the position of the fitting surface with respect to the radial direction of the shaft portion. In this way, in welding, the proportion of nickel-based alloy in the weld metal is reduced, and thus the proportion of e.g. titanium and niobium in the weld metal is reduced. As a result, generation of a hot crack in the weld metal at the time of welding is reduced, which makes it possible to reduce breakage of the welded part between the nozzle vane and the lever during usage of the nozzle vane and the lever.

(7) In some embodiments, in the joint structure of a nozzle vane and a lever described in the above (6), an expression of $D/S \geq 0.25$ is satisfied, where D is a distance between the radiation-center position and the position of the fitting surface with respect to the radial direction of the shaft portion and S is a width of weld metal with respect to the radial direction of the shaft portion.

With the above joint structure (7) of a nozzle vane and a lever, the proportion of nickel-based alloy in the weld metal is sufficiently reduced, and thus the proportion of e.g. titanium and niobium in the weld metal is sufficiently reduced. As a result, generation of a hot crack in the weld metal at the time of welding is reduced effectively, which makes it possible to reduce breakage of the welded part between the nozzle vane and the lever during usage of the nozzle vane and the lever.

(8) A variable geometry turbocharger according to some embodiments comprises: the joint structure of a nozzle vane and a lever according to the above (6) or (7); the turbine wheel; and a compressor driven by the turbine wheel.

With the above variable geometry turbocharger (8), since at least the above joint structure (6) is provided, at the time of welding the lever and one end side of the shaft portion of the nozzle vane, the proportion of nickel-based alloy in the weld metal is reduced, and thus the proportion of e.g. titanium and niobium in the weld metal is reduced. Accordingly, generation of a hot crack in weld metal at the time of welding is reduced. As a result, it is possible to reduce breakage of the welded part between the nozzle vane and the lever in operation of the turbocharger.

(9) A method of joining a nozzle vane and a lever by welding according to some embodiments comprises: providing a nozzle vane to be disposed in an exhaust passage for guiding exhaust gas to a turbine wheel of a variable geometry turbocharger, the nozzle vane including a shaft portion and being composed of nickel-based alloy, and a lever including a fitting surface to be fitted with a peripheral surface on one end side of the shaft portion, for transmitting torque to the shaft portion to adjust a vane angle of the nozzle vane, the lever being composed of stainless steel; and welding the lever and the one end side of the shaft portion by radiating heat to the lever and the one end side of the shaft portion so that a radiation-center position is disposed outside a position of the fitting surface with respect to a radial direction of the shaft portion.

Since a nozzle vane made of nickel-based alloy has a high strength against heat and a high oxidization-resistant property, it is difficult to perform cold pressing such as fine blanking pressing, which could be used to join two stainless objects, to join the nozzle vane and the lever. Thus, it is desirable to join the nozzle vane to the lever by welding.

However, nickel-based alloy contains many types of elements such as titanium and niobium, which increases the risk of generation of a hot crack in weld metal during welding (titanium and niobium may be a cause that increases sensitivity to hot cracking).

In this regard, with the above joining method (9), the lever and the one end side of the shaft portion are welded by radiating heat so that the radiation-center position is at the position outside the position of the fitting surface in the radial direction of the shaft portion. In this way, in welding, the proportion of nickel-based alloy in the weld metal is reduced, and thus the proportion of e.g. titanium and niobium in the weld metal is reduced. As a result, generation of a hot crack in the weld metal at the time of welding is reduced, which makes it possible to reduce breakage of the welded part between the nozzle vane and the lever during usage of the nozzle vane and the lever.

(10) In some embodiments, in the method of joining a nozzle vane and a lever according to the above (9), heat is radiated so that an expression of D/S≥0.25 is satisfied, where D is a distance between the radiation-center position and the position of the fitting surface with respect to the radial direction of the shaft portion and S is a width of weld metal with respect to the radial direction of the shaft portion.

According to the above method (10) of joining a nozzle vane and a lever, the proportion of nickel-based alloy in the weld metal is sufficiently reduced, and thus the proportion of e.g. titanium and niobium in the weld metal is sufficiently reduced. As a result, generation of a crack in the weld metal at the time of welding is reduced effectively, which makes it possible to reduce breakage of the welded part between the nozzle vane and the lever during usage of the nozzle vane and the lever.

Advantageous Effects

According to some embodiments of the present invention, it is possible to provide a structure and a method of joining a nozzle vane and a lever, and a variable geometry turbocharger, capable of reducing breakage of a welded part between a shaft portion of the nozzle vane and the lever during usage of the nozzle vane and the lever by reducing generation of a hot crack in weld metal at the welded part.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not intended to limit the scope of the present invention.

Figure 1:
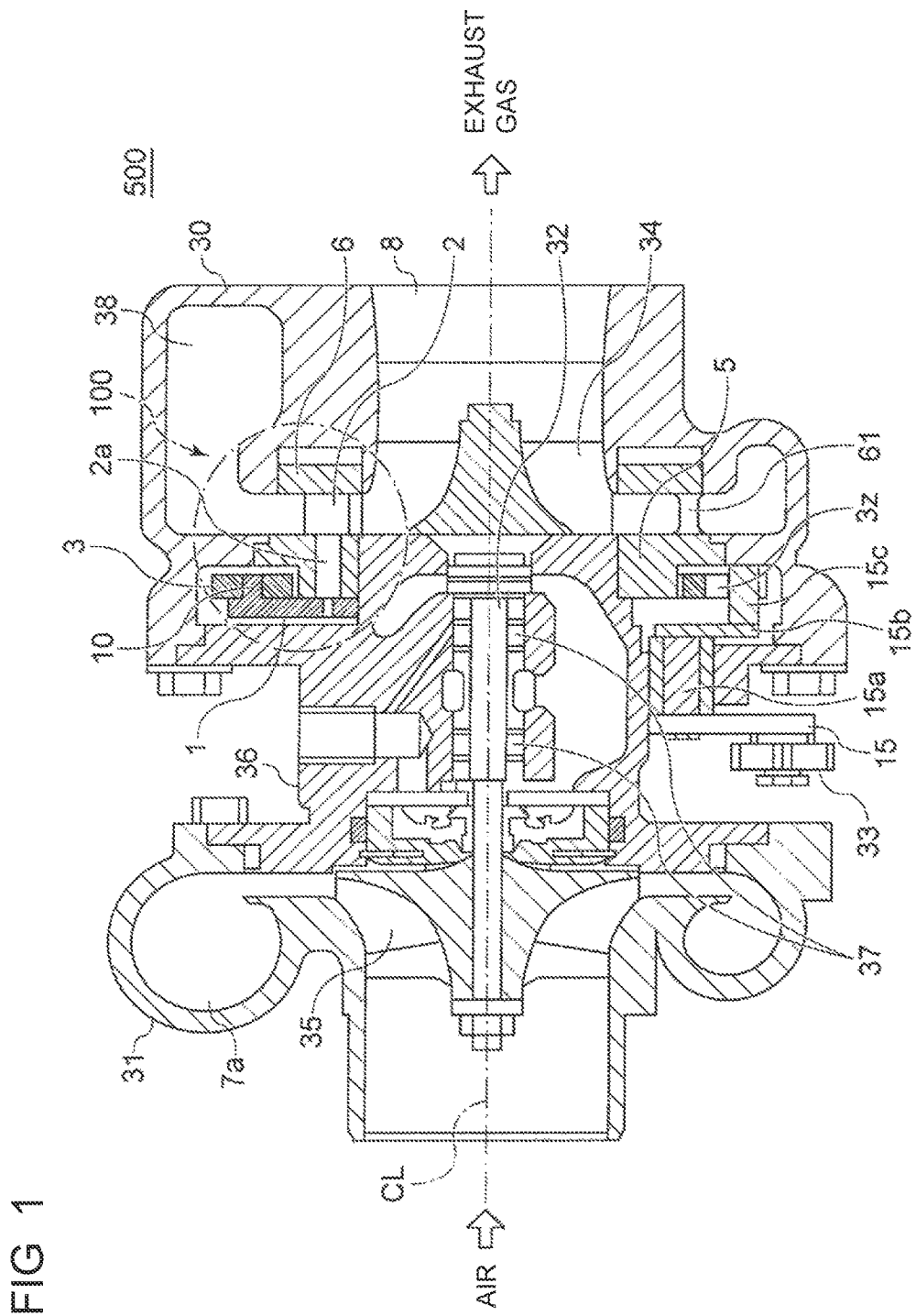
FIG. 1 is a vertical cross-sectional view of a variable-displacement type turbocharger for a gasoline engine according to some embodiments.

FIG. 1 is a vertical cross-sectional view of a variable geometry turbocharger 500 for a gasoline engine according to some embodiments.

In FIG. 1, 30 is a turbine casing and 38 is a scroll part formed in a spiral shape on an outer peripheral part of the turbine casing 30. 34 is a turbine wheel of a radial-flow type, 35 is a compressor, 32 is a turbine shaft coupling the turbine wheel 34 and the compressor 35, 31 is a compressor housing, and 36 is a bearing housing.

The turbine shaft 32 coupling the turbine wheel 34 and the compressor 35 is supported rotatably to the bearing housing 36 via two bearings 37, 37. 8 is an exhaust-gas outlet, and CL is a rotational axis of the variable geometry turbocharger 500.

2 is a nozzle vane, and a plurality of nozzle vanes 2 is disposed at regular intervals in a circumferential direction on a radially inner side of the scroll 38. A shaft portion 2a is formed on a blade end portion of each nozzle vane 2 and supported revolvably to a nozzle mount 5 fixed to the turbine casing 30. The nozzle vanes 2 are disposed in an exhaust channel for guiding exhaust gas to the turbine wheel 34.

A lever (lever plate) 1 is coupled to an opposite side of the shaft portion 2a from the blade end portion. The lever 1 transmits torque received from a drive ring 3 to the shaft portion 2a to revolve the shaft portion 2a, thereby changing a vane angle of the nozzle vane 2.

33 is an actuator rod which transmits reciprocating motion from an actuator (not illustrated). Reciprocating motion of the actuator rod 33 is converted into rotational motion via a link 15 fixed to a rotational shaft 15a. An arm 15b is fixed to the rotation shaft 15a, and a drive pin 15c is disposed on the other end portion of the arm 15b. The drive pin 15c engages with an engagement groove 3z (see FIG. 2) formed on an outer peripheral part of the drive ring 3, and the link 15 transmits rotational motion converted from the reciprocating motion to the drive ring 3 to drive the drive ring 3. A single-dotted chain circle in the drawing indicates a variable nozzle mechanism 100 for changing vane angles of the nozzle vanes 2.

During operation of the variable geometry turbocharger 500 with the configuration illustrated in FIG. 1, exhaust gas from an internal combustion engine (not illustrated) enters the scroll part 38, flows around along the spiral shape of the scroll part 38, and then flows into the nozzle vanes 2 while going around. Then, the exhaust gas flows through vane gaps (openings) between the nozzle vanes 2 to flow into the turbine wheel 34 inward, flows in the radial direction toward the center to perform expansion work on the turbine wheel 34, and then is guided along the axial direction to an exhaust-gas outlet 8 to be discharged outside.

To control a displacement of the above variable geometry turbine, a vane angle of the nozzle vanes 2 is set for the above actuator by a vane-angle control unit (not illustrated), the vane angle being such that a flow rate of exhaust gas flowing through the nozzle vanes 2 becomes a required flow rate. A reciprocation displacement of the actuator corresponding to such a vane angle is transmitted to the drive ring 3 via the link 15 to drive the drive ring 3 to rotate.

In response to revolution of the drive ring 3, the lever 1 coupled to the drive ring 3 via a coupling-pin portion 10 revolves the shaft portions 2a of the nozzle vanes 2. Revolution of the shaft portion 2a causes the nozzle vanes 2 to revolve to achieve the vane angle set by the actuator, and thereby the size of the vane gaps (opening) changes.

Figure 2A:
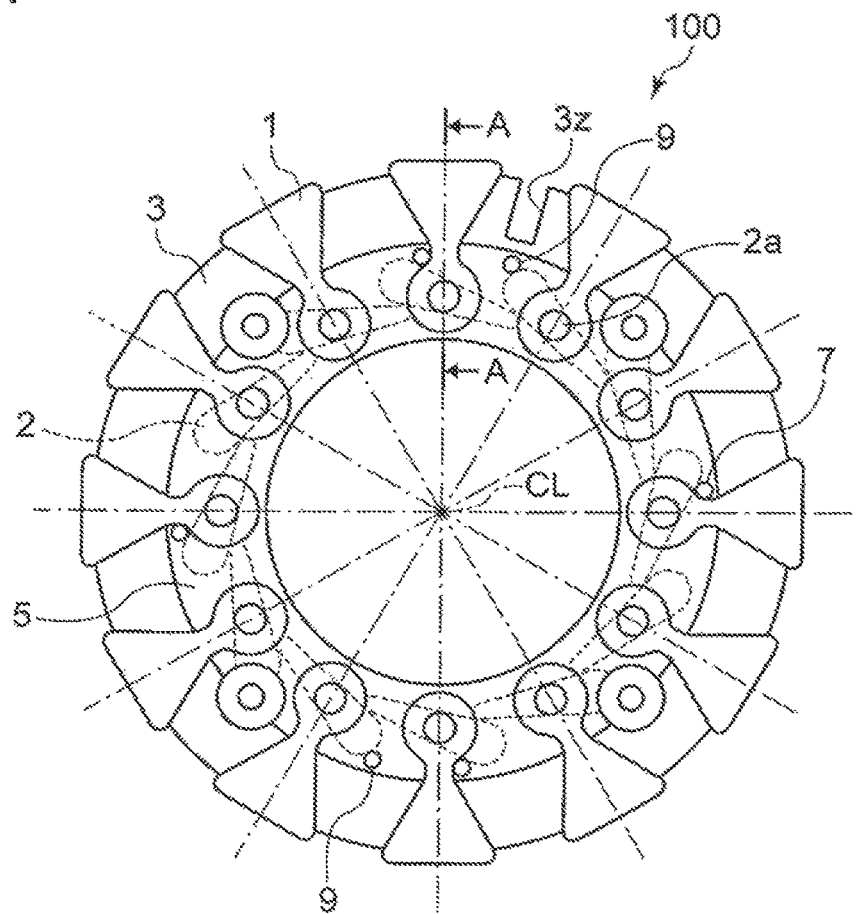
FIG. 2A is a front view of a variable nozzle mechanism as seen from a lever side, according to some embodiments.
Figure 2B:
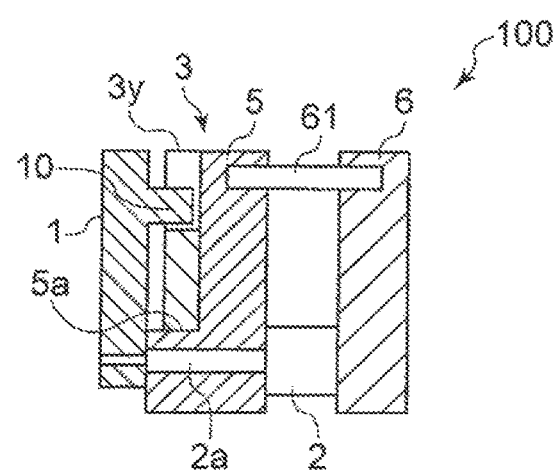
FIG. 2B is a cross-sectional view taken along line A-A in FIG. 2A.

FIGS. 2A and 2B illustrate a variable nozzle mechanism 100. FIG. 2A is a front view as seen from a lever 1 side. FIG. 2B is a cross-sectional view taken along line A-A in FIG. 2A.

The variable nozzle mechanism 100 is configured as follows to change the vane angle of the nozzle vanes 2.

3 is a drive ring formed in a disc shape, fitted onto a guide portion 5a of a circular shape (annular shape) projecting in the direction of the axis CL of the nozzle mount 5 (which is the same as the rotational axis of the variable geometry turbocharger 500) to be supported revolvably. On the outer peripheral side of the drive ring 3, groove portions 3y to be engaged with the coupling pin portions 10 of the levers 1 are formed at regular intervals in the circumferential direction. 3z is a drive groove to be engaged with an actuator rod 33.

The same number of levers 1 as the number of the groove portions 3y of the drive ring 3 are provided at regular intervals in the circumferential direction. The outer peripheral side (one end side) of each lever 1 is fitted into corresponding one of the groove portions 3y disposed on the drive ring 3 via corresponding one of the coupling pin portions 10, and the inner peripheral side (the other end side) of each lever 1 is joined to corresponding one of the shaft portions 2a of the nozzle vanes 2.

The shaft portions 2a are each supported via an axis revolvably to the nozzle mount 5. 6 is a nozzle plate formed in an annular shape, and 61 is a plurality of nozzle supports coupling the nozzle plate 6 and the nozzle mount 5.

7 is a stopper pin. A plurality of stopper pins 7 is disposed at regular intervals in the circumferential direction on an outer peripheral edge portion of an end surface of the guide portion 5a of a cylindrical shape (annular shape) projecting in the direction of the axis CL at the center part of the nozzle mount 5, and fitted into fit-in holes (not illustrated) disposed to extend along the direction of the axis CL (at four positions in the present embodiment).

The stopper pins 7 are so-called opening-degree restricting members which restrict pivoting of the levers 1 at closed positions at the vane gaps (opening) of the nozzle vanes 2, each of the levers 1 pivoting about the shaft portion 2a of the nozzle vane 2 accompanying revolution of the drive ring 3.

9 is a lock pin. The lock pin 9 is a position-determining pin for improving mounting accuracy of the bearing housing 36 and the nozzle mount 5. The lock pin 9 restricts an assembly angle of the bearing housing 36 and the nozzle mount 5 (assembly accuracy), so that a drive amount of the drive ring 3 transmits accurately in accordance with a drive amount of the actuator, and the opening degree of the nozzle vanes 2 is accurately controlled, thereby causing the turbocharger to operate with a sufficient performance.

In the variable nozzle mechanism 100, the drive ring 3 is disposed between a side surface of the lever 1 and a side surface of the nozzle mount 5, as illustrated in FIG. 2B. The lever 1, the drive ring 3, and the nozzle mount 5 are disposed in parallel in the axial direction. In some embodiments, the coupling pin portion 10 is formed integrally with the lever 1.

Figure 3:
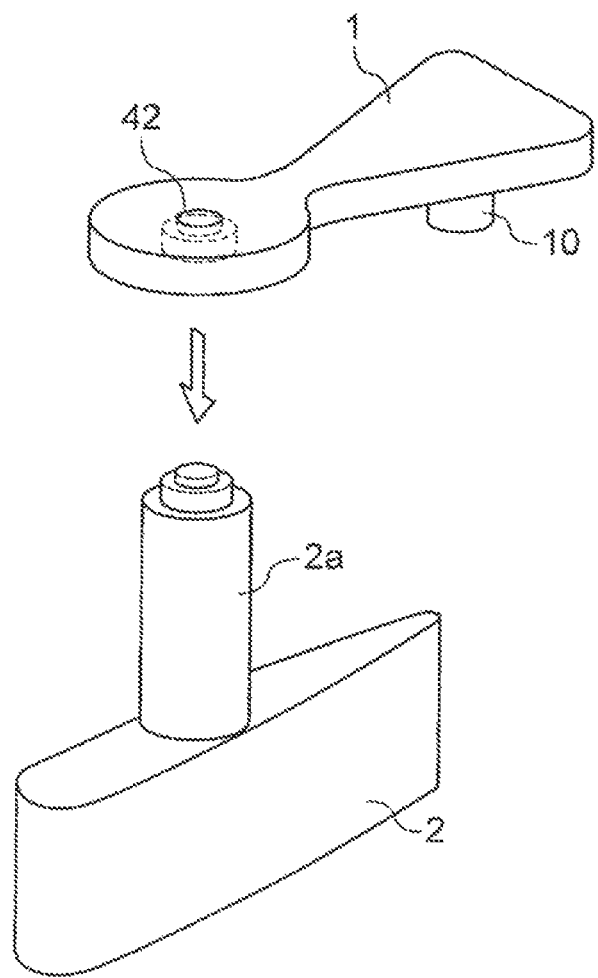
FIG. 3 is a schematic perspective view for describing a configuration of a nozzle vane and a lever according to some embodiments.

FIG. 3 is a schematic perspective view for describing a configuration of the above described nozzle vane 2 and the lever 1.

As illustrated in FIG. 3, a through hole 42 is formed on an end side of the lever 1, and the through hole 42 fits onto an end side of the shaft portion 2a of the nozzle vane 2. Further, the above described coupling pin portion 10 is formed on the other end side of the lever 1.

Figure 4:
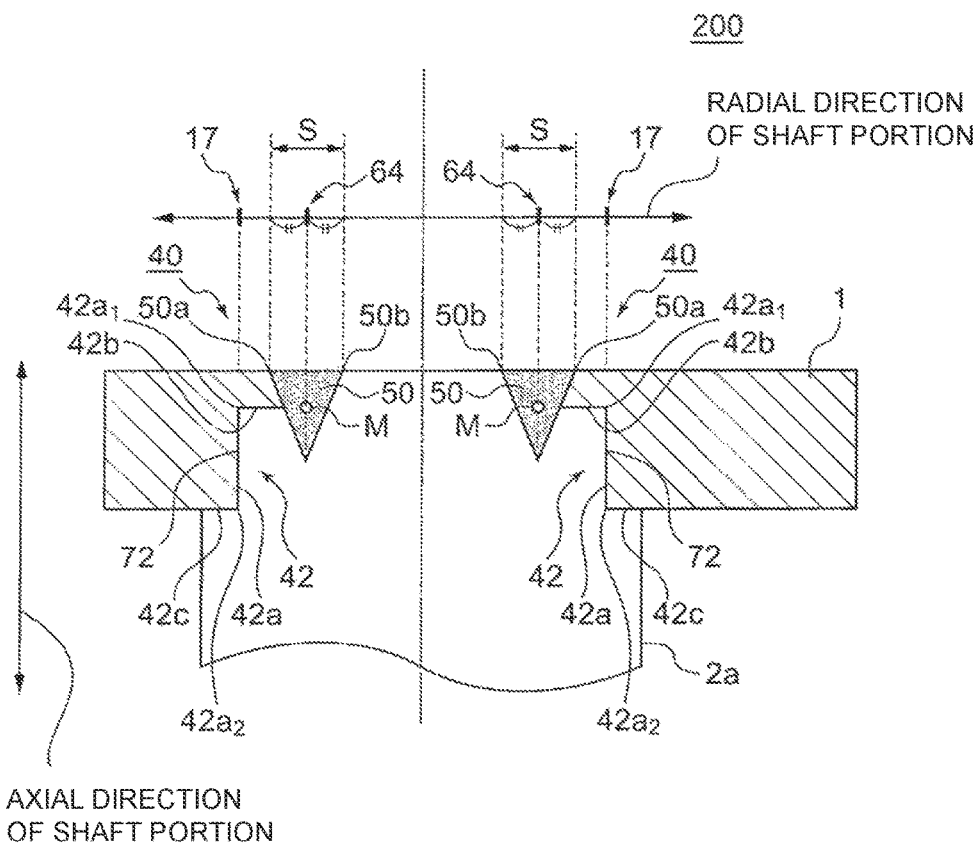
FIG. 4 is a schematic cross-sectional view for describing a joint structure of a nozzle vane and a lever according to some embodiments.

FIG. 4 is a schematic cross-sectional view for describing a joint structure 200 of the nozzle vane 2 and the lever 1 described above, according to some embodiments.

In the joint structure 200 illustrated in FIG. 4, the through hole 42 of the lever 1 includes a fitting surface 42a to be fitted with a peripheral surface 72 of one end side of the shaft portion 2a of the nozzle vane 2. The one end side of the shaft portion 2a and the lever 1 are joined to each other by welding. Weld metal 50 at a welded part 40 between the one end side of the shaft portion 2a and the lever 1 is formed such that a center position 64 of the weld metal 50 is inside a position 17 of the fitting surface 42a in the radial direction of the shaft portion 2a. The center position 64 of the weld metal 50 in the radial direction of the shaft portion 2a refers to a center position of a range S formed by the weld metal 50 in the radial direction of the shaft portion 2a, the center position being a midpoint between the first end 50a and the second end 50b of the weld metal 50 in the radial direction of the shaft portion 2a.

Figure 5:
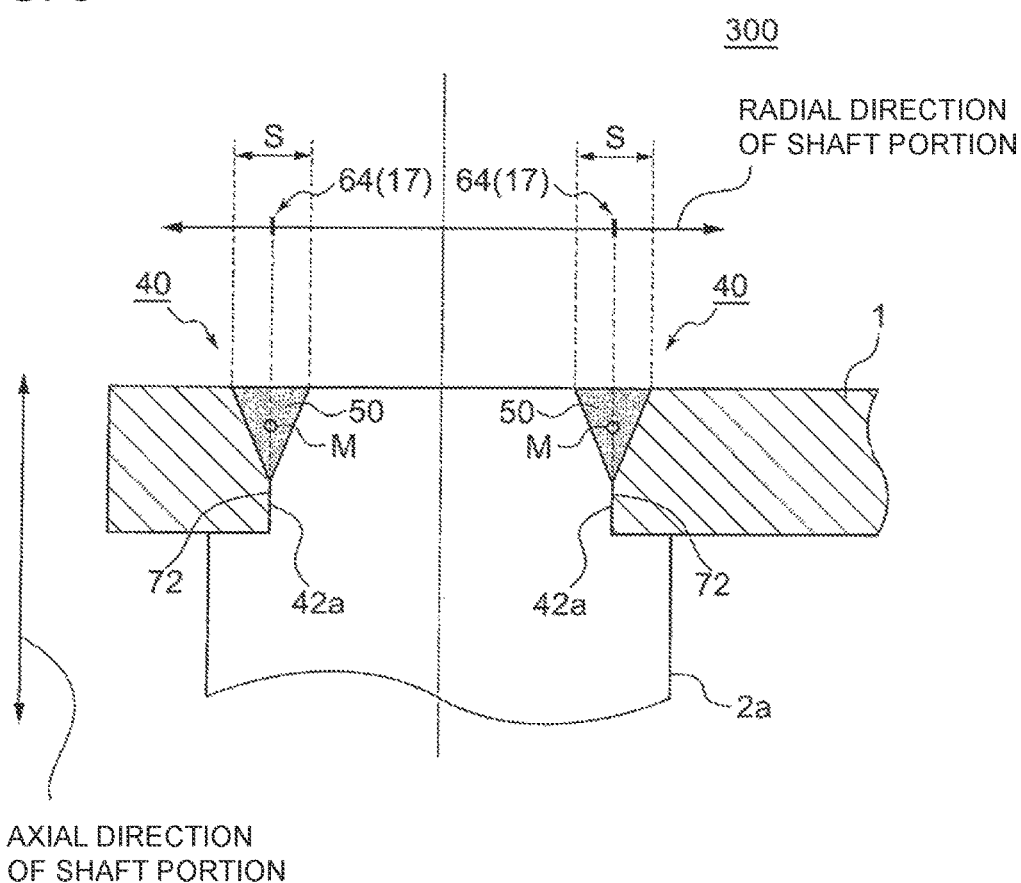
FIG. 5 is a schematic cross-sectional view for describing a joint structure of a nozzle vane and a lever according to a comparative example.

FIG. 5 is a schematic cross-sectional view for describing a joint structure 300 of the nozzle vane 2 and the lever 1 described above, according to a comparative example. In the joint structure 300 illustrated in FIG. 5, the weld metal 50 is formed such that the center position 64 of the weld metal 50 coincides with the position 17 of the fitting surface 42a of the lever 1 in the radial direction of the shaft portion 2a (in a common welding method, these positions coincide).

Figure 6A:
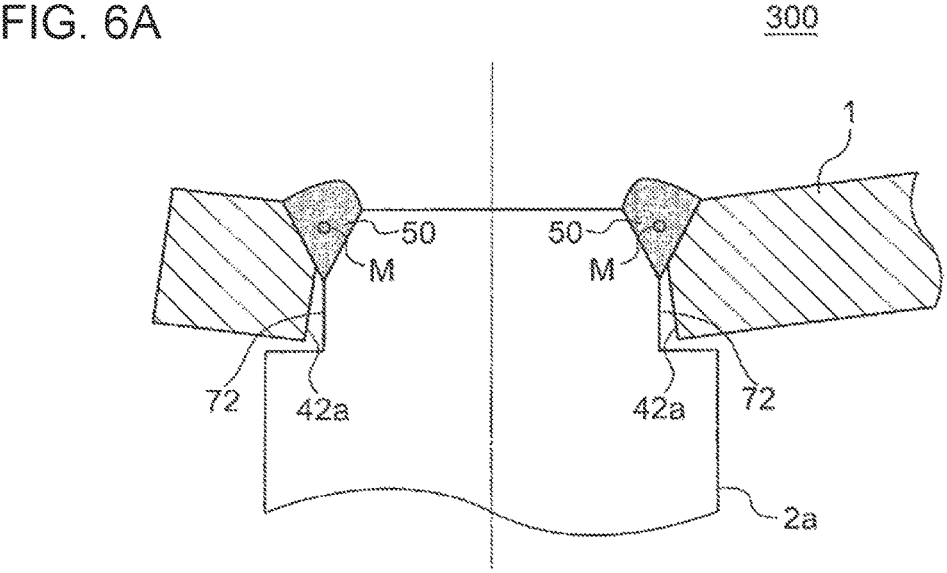
FIG. 6A is a schematic cross-sectional view for describing a manner of deformation accompanying solidification of weld metal in a joint structure of a nozzle vane and a lever according to a comparative example.
Figure 6B:
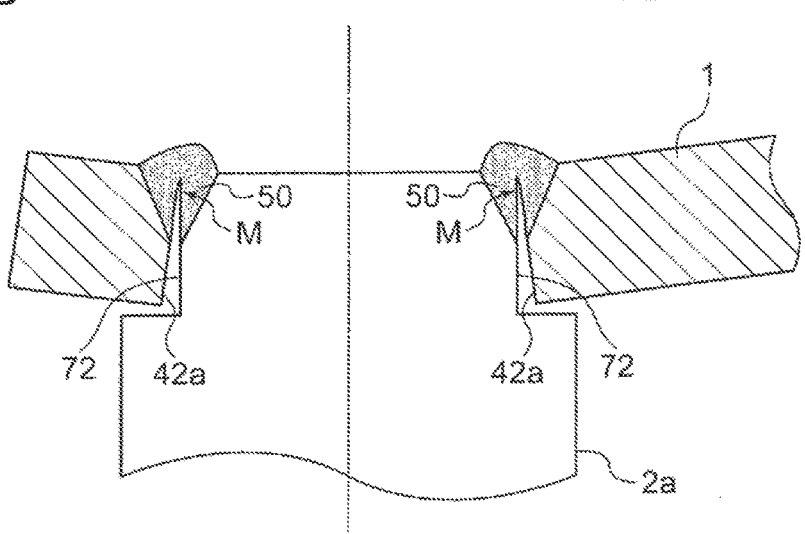
FIG. 6B is a schematic cross-sectional view for describing a state in which a hot crack is formed in weld metal in a joint structure of a nozzle vane and a lever according to a comparative example.

In the joint structure 300, when the nozzle vane 2 and the lever 1 are welded, the weld metal 50 is cooled by a base member to solidify from periphery to center. At this time, deformation due to solidification of the weld metal 50 causes the peripheral surface 72 of the shaft portion 2a and the fitting surface 42a of the lever 1 to move away from each other, as illustrated in FIG. 6A. If large stress is applied to the weld metal 50 due to deformation accompanying solidification in welding, a crack (so-called hot crack) may be produced in a non-solidified region of the weld metal 50 (a center region M of the weld metal 50 being the final solidification region), as illustrated in FIG. 6B.

If such a hot crack is produced in the weld metal 50, the crack may expand during usage of the nozzle vane 2 and the lever 1, and the welded part 40 between the nozzle vane 2 and the lever 1 may break apart.

In contrast, in the joint structure 200 of the nozzle vane 2 and the lever 1 according to some embodiments illustrated in FIG. 4, the weld metal 50 is formed such that the center position 64 of the weld metal 50 is inside the position 17 of the fitting surface 42a in the radial direction of the shaft portion 2a, as described above. In this way, even if the peripheral surface 72 of the shaft portion 2a and the fitting surface 42a of the lever 1 try to move away from each other due to deformation accompanying solidification of the weld metal 50 during welding, stress applied to the non-solidified region of the weld metal 50 (the center region M of the weld metal 50 being the final solidification region) is effectively reduced, which reduces generation of a crack in the weld metal 50. As a result, it is possible to reduce breakage of the welded part 40 between the nozzle vane 2 and the lever 1 during usage of the nozzle vane 2 and the lever 1. Further, it is possible to achieve stable operation of the variable geometry turbocharger 500.

In the joint structure 200 of the nozzle vane 2 and the lever 1 illustrated in FIG. 4, the weld metal 50 is formed inside the fitting surface 42a in the radial direction of the shaft portion 2a. Specifically, the range S of formation of the weld metal 50 in the radial direction of the shaft portion 2a is positioned inside, with respect to the radial direction of the shaft portion 2a, the position 17 of the fitting surface 42a in the radial direction of the shaft 2a. In this way, if a peripheral surface of the shaft portion 2a and the fitting surface 42a of the lever 1 try to move away from each other due to deformation accompanying solidification of the weld metal 50, stress applied to the weld metal 50 is effectively reduced, which reduces generation of a crack in the weld metal 50. As a result, it is possible to reduce breakage of the welded part 40 between the nozzle vane 2 and the lever 1 during usage of the nozzle vane 2 and the lever 1.

In the joint structure 200 of the nozzle vane 2 and the lever 1 illustrated in FIG. 4, the lever 1 includes the first contact surface 42b and the second contact surface 42c. The first contact surface 42b is formed so as to extend inward in the radial direction of the shaft portion 2a from the first end $42a_1$ of the fitting surface 42a with respect to the axial direction of the shaft portion 2a, and contact the shaft portion 2a from the axial direction of the shaft portion 2a. The second contact surface 42c is formed to extend outward in the radial direction of the shaft portion 2a from the second end $42a_2$ of the fitting surface 42a with respect to the axial direction of the shaft portion 2a, and contact the shaft portion 2a from the axial direction of the shaft portion 2a. In this way, with the first contact surface 42b and the second contact surface 42c, it is possible to suppress the motion of the peripheral surface 72 of one end side of the shaft portion 2a and the fitting surface 42a of the lever 1 to move away from each other due to deformation accompanying solidification of the weld metal 50. As a result, stress applied to the weld metal 50 is effectively reduced and generation of a crack in the weld metal 50 is reduced, which makes it possible to reduce breakage of the welded part 40 between the nozzle vane 2 and the lever 1 during usage of the nozzle vane 2 and the lever 1.

In the joint structure 200 between the nozzle vane 2 and the lever 1 illustrated in FIG. 4, the nozzle vane 2 is composed of nickel-based alloy and the lever 1 is composed of stainless steel.

Conventionally, a variable geometry turbocharger is widely used for diesel engines, and the nozzle vane 2 is normally made of stainless steel (typically, austenite stainless steel). In contrast, if a variable geometry turbocharger is to be used in a gasoline engine, it is difficult to use stainless steel as a material of the nozzle vane 2 for the following reason. That is, the nozzle vane 2 is exposed to high-temperature exhaust gas due to its function, and an exhaust-gas temperature of a gasoline engine is higher than that of a diesel engine (in an example, an exhaust-gas temperature of a diesel engine is approximately 850 degrees and that of a gasoline engine is approximately 1000 degrees). Thus, it is difficult to use stainless steel in view of thermal stress, thermal expansion, and high-temperature oxidization generated at the exhaust-gas temperature of a gasoline engine. In this context, it is desirable to use nickel-based alloy as a constituent material of the nozzle vane 2 in the variable geometry turbocharger 500 for a gasoline engine. While usable nickel-based alloy includes, for instance, Inconel, Hastelloy, Nimonic, and Waspaloy (all of which are registered trademarks), Inconel is especially suitable in terms of a strength against heat and an erosion-resistant property, and Inconel 713C is the most suitable.

On the other hand, since nickel-based alloy has a high strength against heat and a high oxidization-resistant property, it is difficult to perform cold pressing such as fine blanking pressing, which could be used to join two stainless objects, to join the nozzle vane 2 and the lever 1. Thus, it is desirable to join the nozzle vane 2 to the lever 1 by welding. However, nickel-based alloy contains many types of elements such as titanium and niobium, which increases the risk of generation of the above described hot crack during welding (titanium and niobium may be a cause that increases sensitivity to hot cracking). Further, a hot crack is likely to be generated also because of a solidification crack due to concentration of impurity elements such as phosphorus and sulfur in the final solidification region.

In this regard, with the joint structure 200 illustrated in FIG. 4, the nozzle vane 2 is made of nickel-based alloy to resist high-temperature exhaust gas of a gasoline engine, and the center position 64 of the weld metal 50 is disposed inside the position 17 of the fitting surface 42a in the radial direction of the shaft portion 2a to suppress generation of a hot crack in welding, which makes it possible to suitably apply the joint structure 200 to the variable geometry turbocharger 500 for a gasoline engine.

Further, to join the nozzle vane 2 and the lever 1 to form the joint structure 200 described in FIG. 4, welding may be performed either by adding weld metal, or by melting base members directly by heat radiation.

Figure 7A:
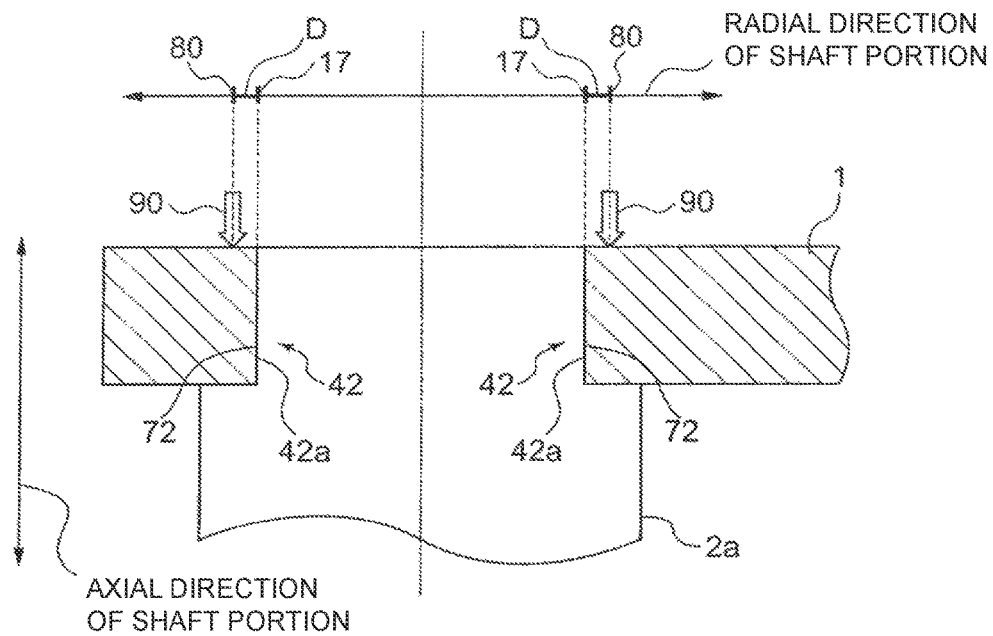
FIG. 7A is a schematic cross-sectional view for describing a method of joining a nozzle vane and a lever according to another embodiment.
Figure 7B:
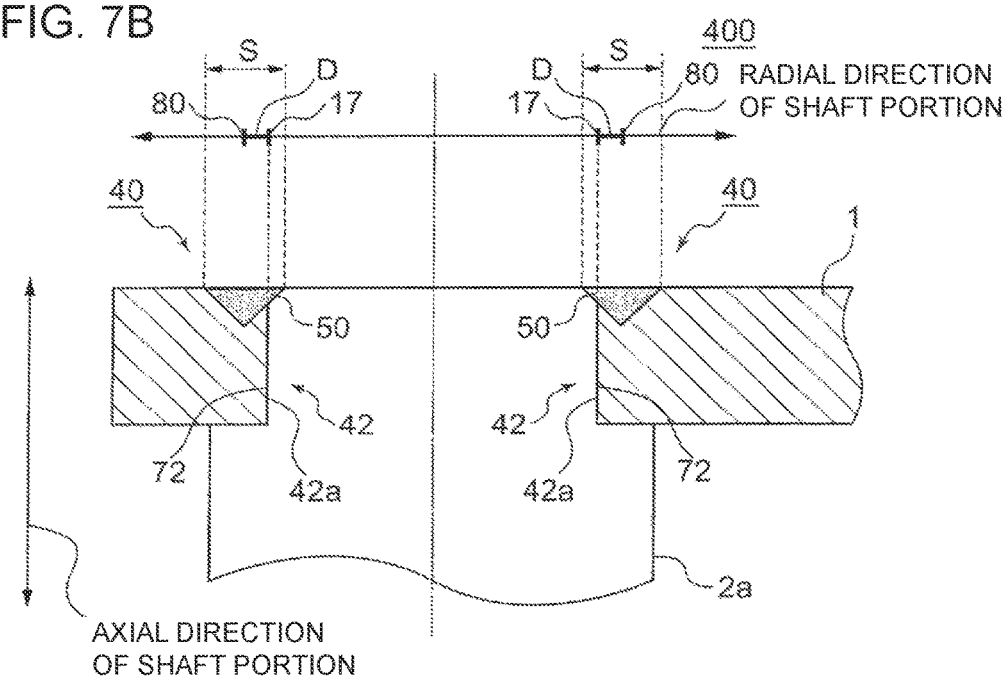
FIG. 7B is a schematic cross-sectional view for describing a state after joining (welding) a nozzle vane and a lever by the method illustrated in FIG. 7A.

FIG. 7 is a schematic cross-sectional view for describing a joining method and a joint structure 400 of the nozzle vane 2 and the lever 1 according to another embodiment. FIG. 7A is a schematic cross-sectional view for describing a method of joining the nozzle vane 2 and the lever 1 according to another embodiment, and FIG. 7B is a schematic cross-sectional view for describing a state (joint structure 400) after joining (welding) the nozzle vane 2 and the lever 1 by the joining method illustrated in FIG. 7A.

In FIG. 7A, the lever 1 is made of stainless steel and the nozzle vane 2 is made of nickel-based alloy. The lever 1 includes the fitting surface 42a to be fitted with the peripheral surface 72 of one end side of the shaft portion 2a.

In the method of joining the nozzle vane 2 and the lever 1 illustrated in FIG. 7A, to join the nozzle vane 2 and the lever 1 by welding, heat 90 is radiated to base members without adding weld metal. At this time, heat is radiated so that a radiation-center position 80 is at a position 80 outside the position 17 of the fitting surface 42a in the radial direction of the shaft portion 2a. As a heat source herein, various heat sources can be used, such as an electron beam and a laser.

As described above, nickel-based alloy used in the nozzle vane 2 excels in strength against heat and oxidization resistance, but contains many types of elements such as titanium and niobium, which increases the risk of generation of a hot crack in the weld metal 50 during welding (titanium and niobium may be a cause that increases sensitivity to hot cracking).

In this regard, according to the above joining method illustrated in FIG. 7A, the lever 1 and the one end side of the shaft portion 2a are welded by radiating heat so that the radiation-center position 80 is at the position 80 outside the position 17 of the fitting surface 42a in the radial direction of the shaft portion 2a. In this way, in welding, the proportion of nickel-based alloy in the weld metal is reduced, and thus the proportion of e.g. titanium and niobium in the weld metal is reduced. As a result, generation of a crack in the weld metal 50 is reduced, which makes it possible to reduce breakage of the welded part 40 between the nozzle vane 2 and the lever 1 during usage of the nozzle vane 2 and the lever 1. Further, it is possible to achieve stable operation of the variable geometry turbocharger 500.

Further, in the joining method illustrated in FIG. 7A, it is desirable to radiate heat so as to satisfy an expression of $D/S \geq 0.25$, where D is a distance between the radiation-center position 80 and the position 17 (groove-center position) of the fitting surface 42a of the lever 1 in the radial direction of the shaft portion 2a, and S is a width of the weld metal 50 in the radial direction of the shaft portion 2a (see FIG. 7B). In this way, the proportion of nickel-based alloy in the weld metal is sufficiently reduced, and thus the proportion of e.g. titanium and niobium in the weld metal is sufficiently reduced. As a result, generation of a hot crack in the weld metal 50 is effectively reduced, which makes it possible to reduce breakage of the welded part 40 between the nozzle vane 2 and the lever 1 during usage of the nozzle vane 2 and the lever 1.

DESCRIPTION OF REFERENCE NUMERALS

1 Lever
2 Nozzle vane
2a Shaft portion
3 Drive ring
3y Groove portion
3z Engagement groove
5 Nozzle mount
5a Guide portion
6 Nozzle plate
7 Stopper pin
8 Exhaust-gas outlet
9 Lock pin
10 Coupling pin portion
15 Link
15a Rotational shaft
15b Arm
15c Drive pin
17 Position of fitting surface in radial direction of shaft portion
30 Turbine casing
32 Turbine shaft
33 Actuator Rod
34 Turbine wheel
35 Compressor
36 Bearing housing
37 Bearing
38 Scroll
40 Welded part
42 Through hole
42a Fitting surface
42a1 First end of fitting surface in axial direction of shaft portion
42a2 Second end of fitting surface in axial direction of shaft portion
42b First contact surface
42c Second contact surface
50 Welded part
50a First end of weld metal in radial direction of shaft portion
50b Second end of weld metal in radial direction of shaft portion
64 Center position of weld metal in radial direction of shaft portion
72 Peripheral surface of one end side of shaft portion
80 Radiation center position
90 Heat source
100 Variable nozzle mechanism
200, 300, 400 Joint structure
500 Variable geometry turbocharger

The invention claimed is:

1. A joint structure of a nozzle vane and a lever, comprising:
    a nozzle vane to be disposed in an exhaust passage for guiding exhaust gas to a turbine wheel of a variable geometry turbocharger, the nozzle vane including a shaft portion; and
    a lever including a fitting surface to be fitted with a peripheral surface on one end side of the shaft portion, for transmitting torque to the shaft portion to adjust a vane angle of the nozzle vane,
    wherein the lever and the one end side of the shaft portion are joined to each other by welding, and
    wherein weld metal at a welded part between the lever and the one end side of the shaft portion is formed so that a center position of the weld metal is disposed inside a position of the fitting surface with respect to a radial direction of the shaft portion, and
    wherein the lever includes
        a first contact surface formed to extend inward in the radial direction of the shaft portion from a first end of the fitting surface with respect to the axial direction of the shaft portion, and to contact the shaft portion from the axial direction of the shaft portion, and
        a second contact surface formed to extend outward in the radial direction of the shaft portion from a second end of the fitting surface with respect to the axial direction of the shaft portion, and to contact the shaft portion from the axial direction of the shaft portion.

2. The joint structure of a nozzle vane and a lever, according to claim 1,
    wherein an outer position of the weld metal is formed inside the fitting surface with respect to the radial direction of the shaft portion.

3. The joint structure of a nozzle vane and a lever, according to claim 1,
    wherein the variable geometry turbocharger is for a gasoline engine, and
    wherein the nozzle vane is composed of nickel-based alloy, and the lever is composed of stainless steel.

4. A variable geometry turbocharger, comprising:
    the joint structure of a nozzle vane and a lever according to claim 1;
    the turbine wheel; and
    a compressor driven by the turbine wheel.

5. A joint structure of a nozzle vane and a lever, comprising:
- a nozzle vane to be disposed in an exhaust passage for guiding exhaust gas to a turbine wheel of a variable geometry turbocharger, the nozzle vane including a shaft portion; and
- a lever including a fitting surface to be fitted with a peripheral surface on one end side of the shaft portion, for transmitting torque to the shaft portion to adjust a vane angle of the nozzle vane,
- wherein the nozzle vane is composed of nickel-based alloy,
- wherein the lever is composed of stainless steel, and
- wherein the lever and the one end side of the shaft portion are welded to each other, and a radiation-center position radiated by heat for welding is disposed outside a position of the fitting surface with respect to a radial direction of the shaft portion, and
- wherein an expression of $D/S \geq 0.25$ is satisfied, where D is a distance between the radiation-center position and the position of the fitting surface with respect to the radial direction of the shaft portion and S is a width of weld metal with respect to the radial direction of the shaft portion.

6. A variable geometry turbocharger, comprising:
- the joint structure of a nozzle vane and a lever according to claim 5;
- the turbine wheel; and
- a compressor driven by the turbine wheel.

7. A method of joining a nozzle vane and a lever by welding, comprising:
- providing
  - a nozzle vane to be disposed in an exhaust passage for guiding exhaust gas to a turbine wheel of a variable geometry turbocharger, the nozzle vane including a shaft portion and being composed of nickel-based alloy, and
  - a lever including a fitting surface to be fitted with a peripheral surface on one end side of the shaft portion, for transmitting torque to the shaft portion to adjust a vane angle of the nozzle vane, the lever being composed of stainless steel; and
- welding the lever and the one end side of the shaft portion by radiating heat to the lever and the one end side of the shaft portion so that a radiation-center position is disposed outside a position of the fitting surface with respect to a radial direction of the shaft portion, and
- wherein heat is radiated so that an expression of $D/S \geq 0.25$ is satisfied, where D is a distance between the radiation-center position and the position of the fitting surface with respect to the radial direction of the shaft portion and S is a width of weld metal with respect to the radial direction of the shaft portion.

\* \* \* \* \*